(12) United States Patent
Bleckmann et al.

(10) Patent No.: US 11,008,916 B2
(45) Date of Patent: May 18, 2021

(54) EXHAUST SYSTEM FOR A MOTOR VEHICLE

(71) Applicant: Daimler AG, Stuttgart (DE)

(72) Inventors: Johannes Bleckmann, Friedrichshafen (DE); Claudia Essmann, Stuttgart (DE); Uwe Gaertner, Remshalden (DE); Alexander Massner, Esslingen (DE); Michael Stiller, Remseck (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/626,790

(22) PCT Filed: Jun. 12, 2018

(86) PCT No.: PCT/EP2018/065420
§ 371 (c)(1),
(2) Date: Dec. 26, 2019

(87) PCT Pub. No.: WO2019/001942
PCT Pub. Date: Jan. 3, 2019

(65) Prior Publication Data
US 2020/0116063 A1 Apr. 16, 2020

(30) Foreign Application Priority Data
Jun. 27, 2017 (DE) ..................... 10 2017 006 059.2

(51) Int. Cl.
*F01N 3/00* (2006.01)
*F01N 3/20* (2006.01)
(Continued)

(52) U.S. Cl.
CPC ....... *F01N 3/2066* (2013.01); *B01D 53/9418* (2013.01); *B01D 2255/20761* (2013.01);
(Continued)

(58) Field of Classification Search
CPC ........ F01N 3/2066; F01N 3/035; F01N 3/106; F01N 2610/02; B01D 53/9418;
(Continued)

(56) References Cited

U.S. PATENT DOCUMENTS

| 9,579,603 B2* | 2/2017 | Sonntag ................ B01J 29/072 |
| 2006/0153761 A1* | 7/2006 | Bandl-Konrad ...... F01N 3/0842 |
| | | 423/239.1 |

(Continued)

FOREIGN PATENT DOCUMENTS

| DE | 10 2015 113 415 A1 | 2/2016 |
| DE | 10 2015 015 260 A1 | 6/2017 |

(Continued)

OTHER PUBLICATIONS

International Search Report (PCT/ISA/210) issued in PCT Application No. PCT/EP2018/065420 dated Sep. 4, 2018 with English translation (five (5) pages).

(Continued)

*Primary Examiner* — Jason D Shanske
(74) *Attorney, Agent, or Firm* — Crowell & Moring LLP

(57) ABSTRACT

In an exhaust system for a motor vehicle having an exhaust treatment device for after-treating exhaust gas of a combustion engine of the motor vehicle, the exhaust gas treatment device includes a first SCR catalyst, which has a zeolite material containing copper, an ammonia slip catalyst, which is arranged downstream of the first SCR catalyst, and a particulate filter. A second SCR catalyst, which has an SCR catalyst material containing vanadium, is arranged upstream of the first SCR catalyst.

7 Claims, 5 Drawing Sheets

(51) Int. Cl.
   *B01D 53/94* (2006.01)
   *F01N 3/035* (2006.01)
   *F01N 3/10* (2006.01)
(52) U.S. Cl.
   CPC .......... *B01D 2255/50* (2013.01); *F01N 3/035* (2013.01); *F01N 3/106* (2013.01); *F01N 2610/02* (2013.01)
(58) Field of Classification Search
   CPC ...... B01D 2255/20761; B01D 2255/50; B01D 53/9463
   USPC .......................................................... 60/286
   See application file for complete search history.

(56) References Cited

U.S. PATENT DOCUMENTS

| | | | |
|---|---|---|---|
| 2010/0050604 A1* | 3/2010 | Hoard | F01N 3/0807 60/286 |
| 2011/0146237 A1 | 6/2011 | Adelmann et al. | |
| 2013/0213008 A1* | 8/2013 | Kumar | F01N 3/2066 60/274 |
| 2014/0237995 A1 | 8/2014 | Yezerets et al. | |
| 2014/0301923 A1* | 10/2014 | Tang | B01J 23/02 423/212 |
| 2015/0240683 A1* | 8/2015 | Hudgens | F01N 3/208 60/286 |
| 2015/0352492 A1* | 12/2015 | Andersen | B01J 23/10 423/237 |
| 2016/0008759 A1* | 1/2016 | Sonntag | B01D 53/9472 423/239.1 |
| 2016/0038878 A1* | 2/2016 | Sonntag | B01D 53/9431 423/213.5 |
| 2016/0045868 A1 | 2/2016 | Sonntag et al. | |
| 2016/0186630 A1* | 6/2016 | Osburn | F01N 3/2066 60/274 |
| 2016/0367941 A1* | 12/2016 | Gilbert | F01N 3/106 |
| 2016/0367973 A1* | 12/2016 | Larsson | B01D 53/9436 |
| 2018/0045097 A1* | 2/2018 | Tang | B01J 29/072 |
| 2018/0078926 A1* | 3/2018 | Chen | B01D 53/944 |
| 2018/0111086 A1* | 4/2018 | Chen | F01N 3/2066 |
| 2018/0111089 A1* | 4/2018 | Li | B01D 53/9468 |
| 2018/0274422 A1* | 9/2018 | Smith | F01N 3/035 |
| 2018/0280877 A1* | 10/2018 | Chen | B01J 35/04 |
| 2018/0347423 A1 | 12/2018 | Bleckmann et al. | |

FOREIGN PATENT DOCUMENTS

| | | |
|---|---|---|
| EP | 2 116 293 A1 | 11/2009 |
| EP | 2 230 001 A1 | 9/2010 |
| WO | WO 2016/203249 A1 | 12/2016 |
| WO | WO 2017/088958 A1 | 6/2017 |

OTHER PUBLICATIONS

German-language Written Opinion (PCT/ISA/237) issued in PCT Application No. PCT/EP2018/065420 dated Sep. 4, 2018 (five (5) pages).

German-language Search Report issued in counterpart German Application No. 10 2017 006 059.2 dated Feb. 20, 2018 with partial English translation (13 pages).

* cited by examiner

EXHAUST SYSTEM FOR A MOTOR VEHICLE

BACKGROUND OF THE INVENTION

Field of the Invention

The present invention relates to an exhaust system for a motor vehicle, having an exhaust treatment device for after-treating exhaust gas of a combustion engine of the motor vehicle. The exhaust gas treatment device comprises a first SCR catalyst, which has a zeolite material containing copper, an ammonia slip catalyst, which is arranged downstream of the first SCR catalyst, and a particulate filter.

Description of Related Art

By way of example, U.S. Patent Application Publication US 2014/0237995 A1 describes a system having a combustion engine, the exhaust gas thereof being fed into a SCR catalyst having a zeolite material containing copper. The treatment system also comprises an ammonia-oxidisation catalyst and a diesel particulate filter. A fluid flow is fed into the zeolite catalyst containing copper, which contains urea, ammonia or hydrocarbons, in order to extract sulphur from the zeolite catalyst at temperatures of from less than 500° C. to 600° C.

It is usually the case that a desulphurisation of zeolite catalysts containing copper or exchanged for copper requires high temperatures in the region of from 500° C. to 600° C. under normal exhaust conditions of a combustion engine operated on diesel. In order to reach such temperatures, additional heating measures are necessary. With exhaust treatment systems used currently, which fulfill the Euro-6 or EPA-10 standards, this is achieved through a diesel oxidisation catalyst which is upstream of the zeolite catalyst containing copper. An additionally injected mass of fuel is converted in the oxidisation catalyst. In this way, the temperature of the exhaust gas is raised. This leads, however, to an increased fuel consumption and also to an increased thermal load and ageing of the exhaust system, more particularly the exhaust gas treatment device.

SUMMARY OF THE INVENTION

It is thus the object of the present invention to create an improved exhaust system like the one mentioned at the beginning.

This object is achieved by means of an exhaust system having features claimed. Advantageous designs with appropriate developments of the invention are specified in the dependent claims.

The exhaust system for a motor vehicle according to the invention, which can more particularly be a commercial vehicle, comprises an exhaust treatment device for treating exhaust gas of a combustion engine of the motor vehicle. The exhaust gas treatment device comprises a first SCR catalyst which has a zeolite material containing copper. Furthermore, the exhaust treatment device comprises an ammonia slip catalyst, which is arranged downstream of the first SCR catalyst. A particulate filter of the exhaust treatment device is arranged downstream of the ammonia slip catalyst. A second SCR catalyst is arranged upstream of the first SCR catalyst. The second SCR catalyst has an SCR catalyst material containing vanadium. This is based on the recognition that an SCR catalyst containing vanadium causes a chemical reaction, in particular of long-chain hydrocarbons. In the case of such a partial oxidation, formation of carbon monoxide and the splitting up of the long-chain hydrocarbons into short-chain hydrocarbons arise. Consequently, reducing agent molecules are made available by means of the SCR catalyst containing vanadium.

These reducing agent molecules penetrate into the cage structure of the zeolite catalyst containing copper and dissolve sulphur compounds stored there. Due to the removal of sulphur compounds from the zeolite material containing copper of the first SCR catalyst, the first SCR catalyst in improved measures is thus able to carry out a denitrification of the exhaust gas. This denitrification is the selective catalytic reduction conducted by the first SCR catalyst (SCR=selective catalytic reduction), thus a selective catalytic reduction through which nitrogen oxides contained in the exhaust gas with ammonia are converted into nitrogen and water to the greatest possible extent.

The accumulation of sulphur compounds on the zeolite material containing copper limits its efficiency with regard to the denitrification of the exhaust gas. Due to the upstreaming of the SCR catalyst containing vanadium, the ability of the first SCR catalyst to remove nitrogen oxides from the exhaust gas is accordingly permanently maintained. Due to the release of the sulphur compounds, these do not impede the SCR reaction of the zeolite catalyst containing copper. Moreover, the SCR catalyst containing vanadium also catalyses the SCR reaction and thereby contributes to the denitrification of the exhaust gas.

For a particularly regular release of the zeolite material containing copper of the first SCR catalyst from sulphur, fuel is introduced upstream of the second SCR catalyst into the exhaust gas. However, the temperature necessary for this desulphurisation can be significantly lowered. No temperatures of from 500° C. to 600° C. need to be set in the zeolite material containing copper of the first SCR catalyst in order to desulphurise the zeolite material containing copper. Rather, the zeolite catalyst containing copper can already be released from sulphur compounds in a temperature range between 300° C. and 500° C., by suitable reducing agents being made available by means of the SCR catalyst containing vanadium for the reduction of the sulphur compounds.

The zeolite catalyst containing copper, which is more prone to sulphur accumulations compared to the SCR catalyst containing vanadium, has the great advantage that even at low exhaust gas temperatures, a good diminution of the nitrogen oxide content in the exhaust gas is already enabled by means of the selective catalytic reduction. This is an advantage, for example, in the case of a cold start of the motor vehicle having the exhaust system.

The SCR catalyst containing vanadium is not as strongly active with regard to the denitrification of exhaust gas at a lower temperature of the exhaust gas. However, the SCR catalyst containing vanadium is characterised by quick start-up behaviour. Accordingly, a considerable reduction of the nitrogen oxide content in the exhaust gas, in the case of a reduced amount of the ammonia present in the exhaust gas, is already achievable by means of the SCR catalyst containing vanadium. In other words, only a minimal ammonia-level is necessary in order to allow the selective catalytic reduction reaction to take place in the SCR catalyst containing vanadium. Moreover, the SCR catalyst containing vanadium is hardly prone to a sulphur accumulation. Rather, the release or dissolving of sulphur compounds already takes place at low exhaust gas temperatures in the SCR catalyst containing vanadium.

The zeolite catalyst containing copper is thus characterised on the one hand by a very good low temperature activity. On the other hand, the start-up behaviour of the zeolite catalyst containing copper, which is slow compared to the SCR catalyst containing vanadium, leads to a high storage capacity for ammonia. The storage of a comparably large amount of ammonia by means of the zeolite catalyst containing copper again means that an ammonia breakthrough or ammonia slip is diminished. Correspondingly, the ammonia-slip catalyst arranged in the direction of flow of the exhaust gas seen through the exhaust system downstream of the first SCR catalyst is also impinged by ammonia in particularly small amounts.

The combination of the first SCR catalyst with the second SCR catalyst, which is arranged in the direction of flow of the exhaust gas seen through the exhaust system upstream of the first SCR catalyst, thus leads to advantageous synergy effects. Moreover, by providing the first SCR catalyst as well as the second SCR catalyst, a particularly effective exhaust gas treatment device is provided with regard to the reduction of the content of nitrogen oxides in the exhaust gas of the combustion engine.

Furthermore, a comparatively large volume of urea solution can be introduced upstream of both SCR catalysts into the exhaust gas. From such an aqueous urea solution, which is, for example, available under the description AdBlue®, the ammonia is released in the hot exhaust gas, which is then converted in the SCR catalysts with the nitrogen oxides into nitrogen and water. Since the SCR catalyst material containing vanadium and the zeolite material containing copper are free from noble metals, as are used in the ammonia-slip catalyst, there is no fear of formation of nitrous oxide ($N_2O$) in the SCR catalysts due to an oxidation of ammonia on both SCR catalysts, provided that these are kept free from ammonia deposits. It is further advantageous that the SCR catalyst containing vanadium is the SCR catalyst flowed through first after leakage of the exhaust gas from the combustion engine in the direction of flow of the exhaust gas, since the SCR catalyst containing vanadium has a low $N_2O$ selectivity and an $N_2O$ formation of $NO_2$ raw engine emissions can thus be kept low, such that the $N_2O$ emissions at the outlet from the exhaust system can also be kept as low as possible.

A section of the exhaust system between the second SCR catalyst and the first SCR catalyst is preferably free from at least one further catalyst. It can thereby be ensured that the short-chain hydrocarbons made available for the first SCR catalyst from the second catalyst and the carbon monoxide are unreservedly available for desulphurising the zeolite catalyst containing copper.

Additionally or alternatively, a section between the first SCR catalyst and the ammonia slip catalyst is preferably free from at least one further catalyst. In this way, possible escaping ammonia from the first SCR catalyst can be directly oxidised in the ammonia slip catalyst.

It is particularly advantageous if the individual catalysts are directly, i.e. without a pipeline between them, adjacent to each other. In particular, an output side of the first SCR catalyst can be adjacent to an input side of the ammonia slip catalyst, and/or an input side of the first SCR catalyst can be adjacent to an output side of the second SCR catalyst. A particularly compact exhaust gas treatment device is thereby created on one side. Furthermore, a hybrid catalyst is created in this way, in which the functions of the individual catalysts are in direct succession in the axial direction, so in the direction of flow of the exhaust gas seen through the exhaust system. This reduces the complexity of the exhaust system.

A layer of zeolite material containing copper is preferably applied onto a surface of the ammonia slip catalyst having at least one noble metal. The zeolite material containing copper serves for the reduction of the nitrogen oxide concentration in the exhaust gas to a lesser extent, by the selective catalyst reduction reaction (SCR) taking place in the zeolite material containing copper. Furthermore, the provision of such a layer made out of zeolite material containing copper on the surface, which has at least one noble metal, more particularly from the platinum group, of the ammonia slip catalyst leads to a particularly small amount of nitrous oxide being formed, despite the oxidisation of ammonia by means of the ammonia slip catalyst. In addition, nitrogen oxides formed by the oxidation of ammonia in the ammonia slip catalyst are converted into nitrogen and water when passing through the layer of zeolite material containing copper with the ammonia stored in the zeolite material containing copper. The layer of zeolite material containing copper thereby in particular ensures particularly low nitrogen oxides emissions and particularly low nitrous oxide emissions of the ammonia slip catalyst.

An oxidisation catalyst is preferably arranged downstream of the ammonia slip catalyst and upstream of the particulate filter. By means of such an oxidisation catalyst, the reducing agents present downstream of both SCR catalysts, formed from the fuel introduced into the exhaust gas, can be oxidised particularly well in order to reach a high exhaust gas temperature. This high exhaust gas temperature is again necessary for the periodic regeneration of the particulate filter, which is downstream of the oxidation catalyst. The complete oxidation of the introduced reducing agents approximately in the form of the short-chain hydrocarbons and the carbon monoxide thus takes place on the downstream catalysts containing noble metals in the form of the ammonia slip catalyst and in particular the oxidation catalyst.

The ammonia slip catalyst and the oxidation catalyst are preferably arranged on a common carrier body. It can thus be particularly easily ensured that the ammonia slip catalyst and the oxidation catalyst are also directly adjacent to one another. Moreover, the hybrid catalyst having at least the first SCR catalyst and the ammonia slip catalyst as well as the oxidation catalyst is particularly compact.

A layer made from a zeolite material containing copper is preferably applied to a surface having at least one noble metal of the oxidation catalyst. A downstream section of the oxidation catalyst is hereby free from the layer. In other words, the zeolite material layer containing copper does not reach across the whole length of the oxidation catalyst in the direction of flow of the exhaust gas seen through the oxidation catalyst, which leads to the oxidation catalyst being able to fulfil its function particularly well, to oxidise the reducing agents contained in the exhaust gas for heating the downstream particulate filter. Nevertheless, it can be ensured by means of an overlapping of the layer of zeolite material containing copper, which is applied onto the surface of the ammonia slip catalyst, with an upstream section of the oxidation catalyst, that a formation or release of nitrous oxide and nitrogen oxides from the ammonia slip catalyst and from the oxidation catalyst is particularly extensively prevented.

A noble metal content of the ammonia slip catalyst is preferably smaller than a noble metal content of the oxidation catalyst. By way of example, a loading of noble metals from the group of platinum metals can be in the ammonia slip catalyst in the range of 1 gram per cubic foot to 5 grams per cubic foot. In contrast, the noble metal loading, more particularly with at least one noble metal from the group of platinum metals, can be in the oxidation catalyst in the range of 10 grams per cubic foot to 50 grams per cubic foot.

The comparably low noble metal content of the ammonia slip catalyst ensures a high selectivity with regard to the formation of nitrogen from ammonia and nitrogen oxides in the layer of zeolite material containing copper. In contrast, the comparably high noble metal content of the oxidation catalyst ensures a good and quick increase of the temperature of the exhaust gas when fuel or carbon monoxide is supplied into the oxidation catalyst. Thereby, due to the fact that as good as no ammonia is now present in the region of the oxidation catalyst, even the high noble metal content of the oxidation catalyst can nevertheless hardly contribute to an intensified nitrous oxide formation. The high noble metal content of the oxidation catalyst incidentally also ensures a comparably low start-up temperature of the oxidation catalyst regarding HC, CO- and NO-oxidation.

The first SCR catalyst and the ammonia slip catalyst can be arranged on a common carrier body. More particularly, the first SCR catalyst, the ammonia slip catalyst and the oxidation catalyst can thus be arranged on the common carrier body, which is located in a housing of the hybrid catalyst. This is then in particular advantageous if the second SCR catalyst, which has the SCR catalyst material containing vanadium, is formed as a pre-catalyst that is comparably close to the engine, thus is arranged in closer proximity to the combustion engine, while the first SCR catalyst is located in a housing of the exhaust system further from the engine.

However, it can also be provided that the first SCR catalyst and the second SCR catalyst are arranged on a common carrier body, wherein the ammonia slip catalyst and the oxidation catalyst are then preferably arranged on a further common carrier body. Even in the case of this design, both SCR catalysts on the one side and the ammonia slip catalyst as well as the oxidation catalyst on the other side are able to be located in a common housing of the exhaust system, such that a compact hybrid catalyst is made available. However, the individual components of the exhaust gas treatment device are then arranged directly adjacent to one another, such that they can fulfil their respective function especially well.

It has been shown as further advantageous if a dosing device for introducing fuel into exhaust gas to be supplied into the second SCR catalyst is provided upstream of the second SCR catalyst. In this way, long-chain hydrocarbons can in particular be made available to the SCR catalyst containing vanadium especially easily, which are then converted into short-chain hydrocarbons and carbon monoxide. These reducing agents are then again made available to the zeolite catalyst containing copper for desulphurising.

Furthermore, the problems that are accompanied by the introduction of fuel into the exhaust gas through a late after-injection in the cylinder of the combustion engine can be reduced in this way. The late after-injection, during which the injected fuel no longer combusts in the combustion chamber of the cylinder but rather arrives in the exhaust device uncombusted, in particular leads to an undesired oil dilution of the oil used for lubricating the combustion engine. Moreover, it can result in a sootiness of an exhaust gas recirculation cooler if fuel is introduced into the exhaust gas of the combustion engine via the late after-injection.

Due to the provision of the dosing device for introducing fuel upstream of the second SCR catalyst, enough fuel, depending on demand, for desulphurising the zeolite catalyst containing copper and for regenerating the particulate filter can thereby be made available, without the problems associated with the late after-injection occurring.

Furthermore, depending on the temperature prevailing in the exhaust system, the dosing device for introducing fuel can be used, which is designed to carry out a so-called secondary fuel injection. In particular, it can be provided that the secondary fuel injection is carried out only when a threshold of the temperature is exceeded, for example, when a temperature of approximately 300° C. is exceeded. In particular, the secondary fuel injection can in particular lead to an adsorption of long-chain hydrocarbons on at least one of the SCR catalysts.

If larger quantities of long-chain hydrocarbons accumulate in an uncontrolled manner on the at least one SCR catalyst, this can lead to a sudden, uncontrolled ignition of these hydrocarbons. Such an uncontrolled accumulation of hydrocarbons on an SCR catalyst does not, however, occur at higher exhaust gas temperatures. Thus the secondary fuel injection is preferably only carried out at higher exhaust gas temperatures.

A further SCR catalyst can be arranged downstream of the particulate filter. However, due to the provision of both SCR catalysts in the form of the SCR catalyst containing vanadium and the zeolite catalyst containing copper, a third such SCR catalyst is not necessary either. This reduces the complexity and the costs of the exhaust system. On the other hand, especially good designs can be implemented by means of the third SCR catalyst with regard to the reduction of the nitrogen oxide content of the exhaust gas.

Further advantages, features and details of the invention arise from the subsequent description of a preferred exemplary embodiment as well as with the aid of the drawing. The features and feature combinations specified in the description above, as well as the features and feature combinations specified in the description of the figures and/or merely shown in the figures hereinafter are not just able to be used in the respectively stated combination, but also in other combinations or on their own, without leaving the scope of the invention.

BRIEF DESCRIPTION OF THE DRAWING FIGURES

FIG. 5 illustrates temporal progression of the fuel injection as well as the temperature and the concentrations of certain components in the exhaust gas when the hybrid catalyst is flowed through.

DETAILED DESCRIPTION OF THE INVENTION

Figure 1:
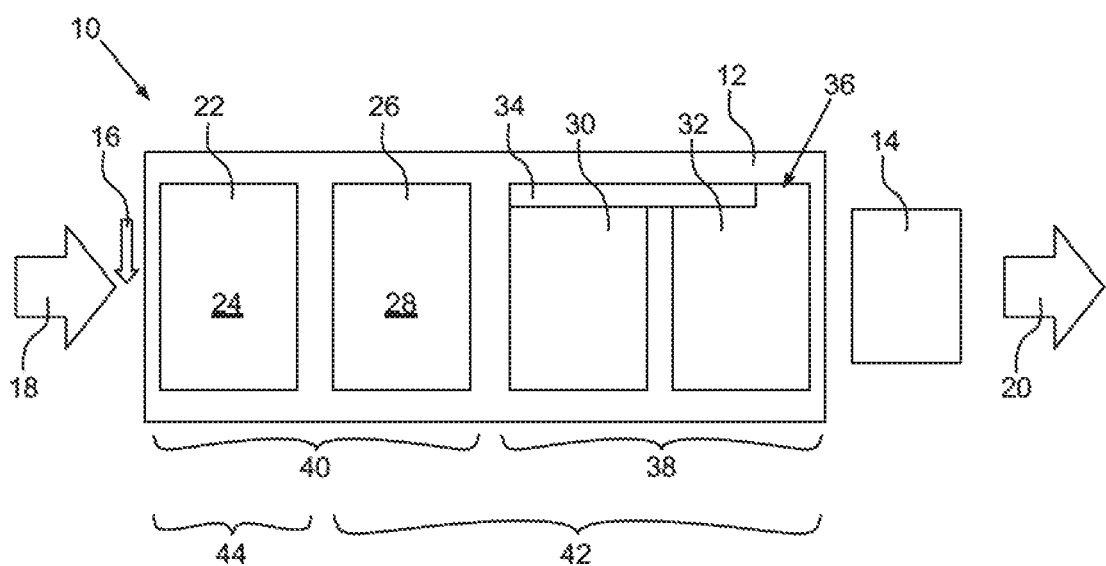
FIG. 1 is a schematic illustration of a section from an exhaust system of a commercial vehicle, wherein a hybrid catalyst is upstream of a particulate filter.

An exhaust system 10 for a motor vehicle, approximately in the form of a commercial vehicle or heavy goods vehicle, is shown in FIG. 1 schematically and in sections. The exhaust system 10 comprises an exhaust gas treatment device in the form of a hybrid catalyst 12 and a particulate filter 14, which is presently formed as a diesel particulate filter. Upstream of the hybrid catalyst 12, an addition point 16 is provided, via which an aqueous urea solution can be introduced into the exhaust gas, which enters the hybrid catalyst 12. The exhaust gas is released from a (not shown) combustion engine of the motor vehicle.

In FIG. 1, a first arrow 18 indicates the entering of the exhaust gas into the hybrid catalyst 12. A further arrow 20 illustrates the exiting of the exhaust gas from the particulate filter 14. Accordingly, a direction of flow of the exhaust gas through the exhaust system 10 is illustrated by the arrows 18, 20. Seen in this direction of flow, the hybrid catalyst 12 can be divided into four axial zones in the present case. In a first axial zone, an SCR catalyst 22 is arranged in the hybrid catalyst 12, which presently has an SCR catalyst material 24 containing vanadium. In a second axial zone attached to the first axial zone in the direction of flow, a further SCR catalyst 26 is arranged in the hybrid catalyst 12. This SCR catalyst 26 has a zeolite material 28 containing copper. An ammonia slip catalyst 30 (ASC) is arranged in the hybrid catalyst 12 in one of the third axial zones attached to the second axial zone in the direction of flow. A fourth axial zone attaches to the third axial zone 4 in the direction of flow of the exhaust gas, an oxidation catalyst 32 being arranged in said fourth axial zone in the hybrid catalyst 12. The oxidation catalyst 32 is presently formed as a diesel oxidation catalyst (DOC).

Furthermore, a layer 34 of zeolite material containing copper is arranged on a surface of the ammonia slip catalyst 30, which has at least one noble metal. The layer 34 also extends slightly into the fourth axial zone, in which the oxidation catalyst 32 is arranged. Accordingly, the layer 32 is also applied in an upstream section of the oxidation catalyst 32 to a surface of the oxidation catalyst 32, which has at least one noble metal. However, a backwards or downstream section 36 of the oxidation catalyst 32 is free from the layer 34.

Curly brackets show in FIG. 1 that the ammonia slip catalyst 30 and the oxidation catalyst 32 can be arranged on a common carrier body 38. Both SCR catalysts 22, 26 can be arranged analogously on a common carrier body 40. In an alternative also schematically shown in FIG. 1, the SCR catalyst 26 containing copper, the ammonia slip catalyst 30 and the oxidation catalyst 32 can be applied onto a common carrier body 42. The SCR catalyst 22 containing vanadium is then applied onto a separate carrier body 44. The carrier bodies 38, 40, 42, 44 can be located in a common housing of the hybrid catalyst 12. The functioning of the individual components of the hybrid catalyst 12 will be explained below.

The SCR catalyst 26 containing copper is particularly suitable for reducing the nitrogen oxide content in the exhaust gas of the combustion engine at low temperatures, for example, in the case of a cold start of the motor vehicle. However, the SCR catalyst 26 containing copper or the SCR catalyst 26 with the zeolite material 28 containing copper is comparably susceptible to an accumulation of sulphur compounds. In order to remove the sulphur compounds from the SCR catalyst 26, the temperature of the exhaust gas can be greatly increased, for example, by introducing fuel into the exhaust gas at an oxidation catalyst, which is, however, presently not provided, upstream of the hybrid catalyst 12. However, this is accompanied by considerable fuel consumption and a high thermal strain on the SCR catalyst 26.

The SCR catalyst 22 containing vanadium or the SCR catalyst 22 with the SCR catalyst material 24 containing vanadium therefore ensures, in the present case, a significant lowering of the temperature required to desulphurise the SCR catalyst 26 containing copper. This is because, when long-chain hydrocarbons are added to the SCR catalyst 22 containing vanadium, for example, by introducing fuel upstream of the hybrid catalyst 12 into the exhaust gas, the SCR catalyst 22 containing vanadium converts these long-chain hydrocarbons into short-chain hydrocarbons and carbon monoxide. These are then available for dissolving and releasing the sulphur compounds in the SCR catalyst 26 containing copper. The introduction of the long-chain hydrocarbons upstream of the SCR catalyst 22 containing vanadium can in particular occur due to a secondary fuel injection, thus due to the introduction of fuel into the exhaust gas by means of a separate dosing device, or due to a late injection of fuel into the combustion chamber of the combustion engine.

Moreover, the SCR catalyst 22 containing vanadium ensures the reduction of nitrogen oxides contained in the exhaust gas in a selective catalytic reduction reaction (SCR=selective catalytic reduction) even in the case of a small stored amount of ammonia. In this reaction, the nitrogen oxides contained in the exhaust gas are converted into nitrogen and water with the ammonia. In order to provide the ammonia, the aqueous urea solution is introduced into the exhaust gas flow at the addition point 16.

In contrast, the SCR catalyst 26 containing copper, in which the SCR reaction also takes place, has a high storage capacity for ammonia. This also results in hardly any ammonia being added to the ammonia slip catalyst 30 arranged downstream.

The oxidation of the ammonia takes place in the ammonia slip catalyst 30, which, in contrast to both SCR catalysts 22, 26, contains noble metals, in particular platinum group metals. However, ammonia is also stored in the layer 34. When ammonia is now converted into nitrogen oxides, these react in turn with the ammonia when passing through the layer 34 during the formation of nitrogen and water. The nitrogen oxide emissions of the ammonia slip catalyst 30 as well as the oxidation catalyst 30 are thereby particularly low. Given that as good as no ammonia gets into the oxidation catalyst 32, hardly any nitrous oxide formation takes place at the oxidation catalyst 32. Therefore, the oxidation catalyst 32 preferably has a dearly higher noble metal content than the ammonia slip catalyst 30. This in turn results in the temperature of the exhaust gas being able to be increased particularly well by means of the oxidation catalyst 32, in order to regenerate the particulate filter 14.

A cell density, i.e. a cross-sectional area of the channels provided in the individual catalysts relative to the surface of the catalyst, can be in the range of 200 to 400 cells per square inch (cpsi) for the SCR catalyst 22 containing vanadium, in the range of 300 to 600 cpsi for the SCR catalyst 26 containing copper, and in the range of 300 to 600 cpsi for the ammonia slip catalyst 30 as well as also in the range of 300 to 600 cpsi for the oxidation catalyst. The volume of the catalysts mentioned can be in the range of 0.2 to 0.6 litres in relation to one litre of a stroke volume of the combustion engine. A quantity of the washcoat applied to a carrier material of the carrier material of the catalysts, which contains the catalytically active substances, can be in the range of 100 to 300 grams per litre for the SCR catalysts 22, 26. However, the SCR catalyst 22 containing vanadium can also be formed from a full extrudate, in which the catalyst material is mixed with the carrier material.

The carrier material usually used is a ceramic carrier, for example, in the form of cordierite, in which the rectangular channels are formed. This ceramic carrier is then coated with the so-called washcoat, which contains the catalytically active components. The washcoat-quantity can be in the range of 100 to 500 grams per litre for the ammonia slip catalyst 30 and in the range of 10 to 150 grams per litre for the oxidation catalyst 32. The volume fraction of the respective catalyst relative to the total volume of the catalysts forming the hybrid catalyst 12 can be in the range of 10 percent to 50 percent for each of the individual catalysts, wherein the sum of the individual percentages of the four present catalysts in the form of the SCR catalyst 22 containing vanadium, the SCR catalyst 26 containing copper, the ammonia slip catalyst 30 and the oxidation catalyst 32 is always 100 percent.

Figure 2:
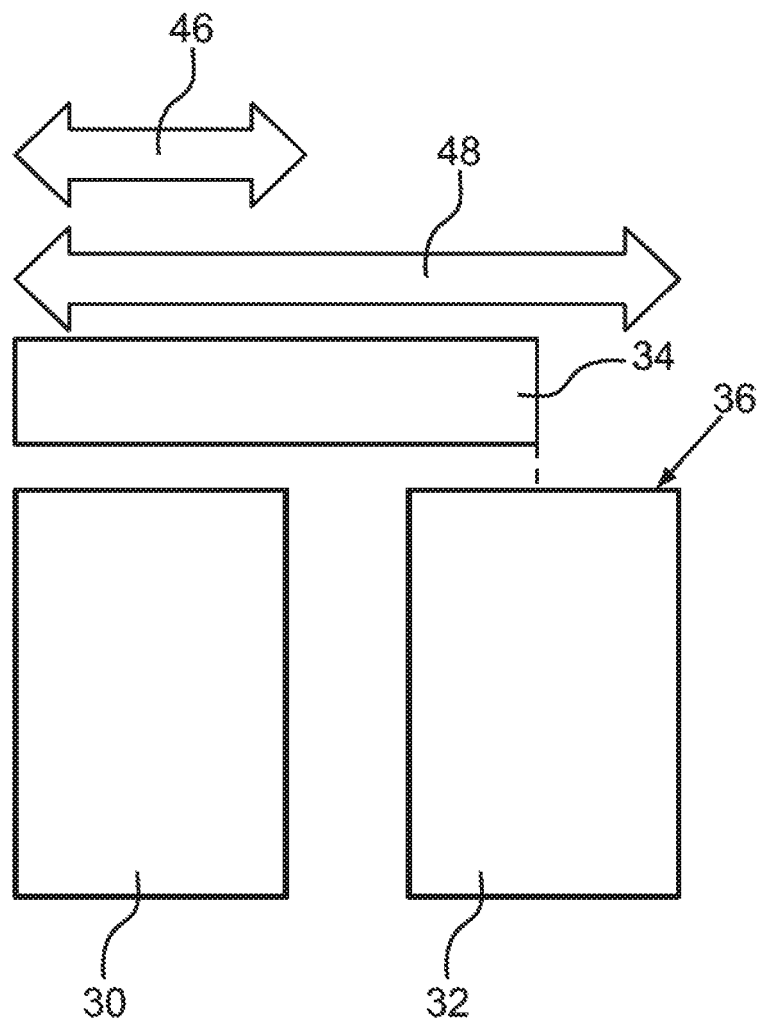
FIG. 2 is a schematic illustration showing possible lengths of components of the hybrid catalyst.

In FIG. 2, a double arrow 46 illustrates a minimum extension of the SCR layer 34 containing copper in the direction of flow of the exhaust gas along the ammonia slip catalyst 30. The layer 34 accordingly extends across the whole axial length of the ammonia slip catalyst 30. A further double arrow 48 illustrates the maximum extension of the layer 34. Accordingly, the layer 34 can cover the oxidation catalyst 32 over its whole axial length. However, at least the downstream section 36 of the oxidation catalyst 32 preferably remains free from the layer 34, as is illustrated in FIG. 2 and also in FIG. 1.

Figure 3:
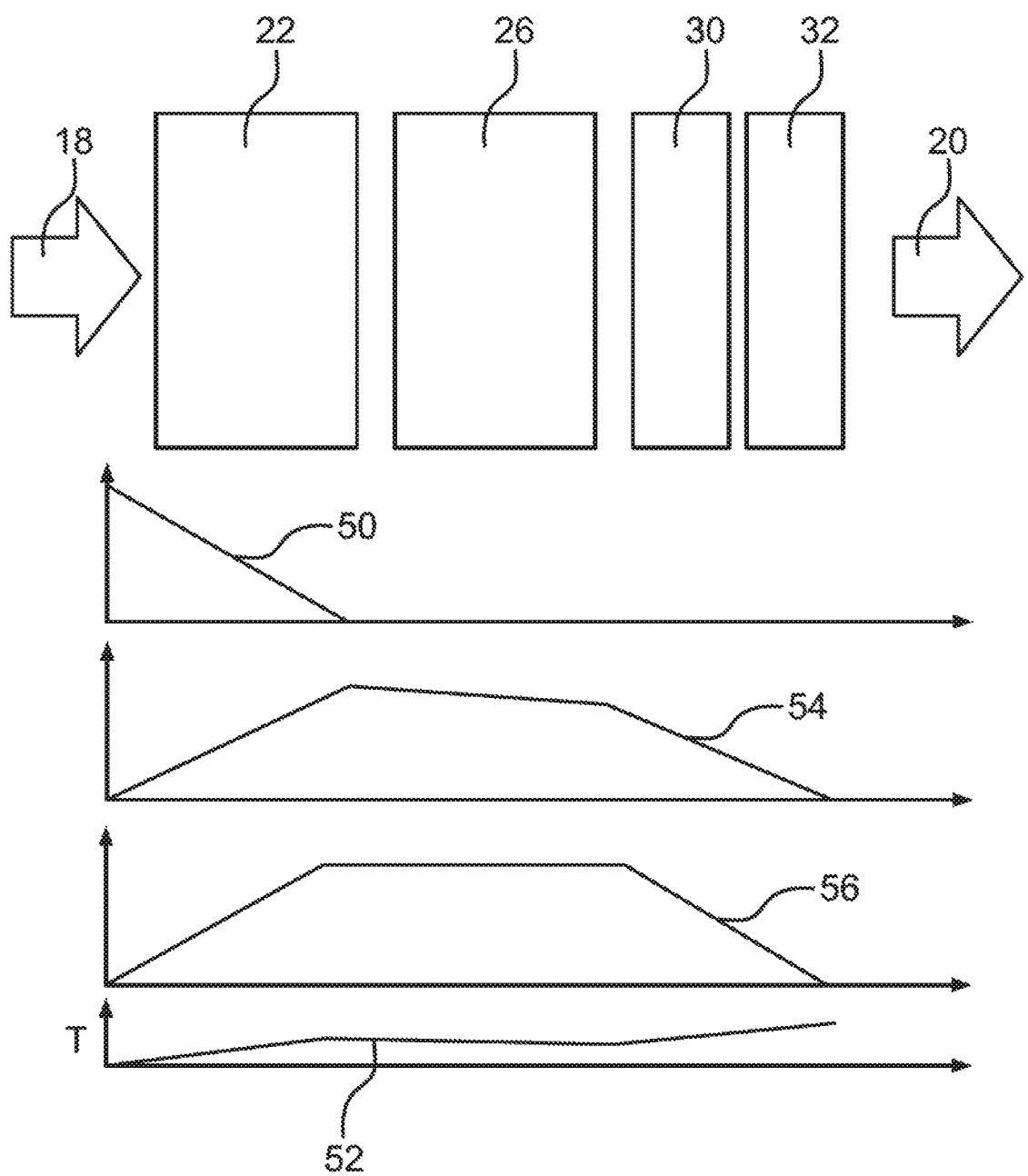
FIG. 3 illustrates formation of reducing agent molecules in the form of short-chain hydrocarbons and carbon dioxide when the hybrid catalyst is impinged with fuel, when a secondary fuel injection is carried out.

FIG. 3 is supposed to illustrate a possible mode of operation of the exhaust system 10. Thus, in a first graph in FIG. 3, a curve 50 indicates the quantity of long-chain hydrocarbons which, seen in the direction of flow of the exhaust gas through the hybrid catalyst 12, are present at respective points of the hybrid catalyst 12 in the exhaust gas which flows through the hybrid catalyst 12. Accordingly, it results in a degradation of the long-chain hydrocarbons in the SCR catalyst 22 containing vanadium. In particular, a partial oxidation of the hydrocarbons takes place. This leads to a temperature increase. The increasing temperature in the direction of flow of the exhaust gas in the hybrid catalyst 12 is represented in FIG. 3 by means of a further curve 52 over the length of the hybrid catalyst 12. Furthermore, short-chain hydrocarbons are made available to the SCR catalyst 26 containing copper. The content of short-chain hydrocarbons relative to the length of the hybrid catalyst 12 is illustrated in FIG. 3 by means of a further curve 54. Analogously, a content of carbon monoxide increases in the exhaust gas when this flows through the hybrid catalyst 12. The carbon monoxide content is illustrated in FIG. 3 by means of a fourth curve 56. According to the curves 54, 56, the short-chain hydrocarbons and the carbon monoxide are oxidised at the output of the oxidation catalyst 32. The temperature (curve 52) is thereby further raised.

In comparison to the SCR catalyst 26 containing copper, the SCR catalyst 22 containing vanadium is characterised by a lower formation of nitrous oxide. In the SCR catalyst 22 containing vanadium as well as in the SCR catalyst 26 containing copper, a reduction of the nitrogen oxide content in the exhaust gas takes place, due to the selective catalytic reduction reaction of ammonia with nitrogen oxides to nitrogen and water. It can also result in a temperature increase in the SCR catalyst 26 containing copper due to a partial oxidation of the hydrocarbons, namely of the short-chain hydrocarbons (compare curve 54) and of the carbon monoxide (compare curve 52). Furthermore, the SCR catalyst 26 containing copper is characterised by a very good reduction of the nitrogen oxide content at low temperatures. In the ammonia slip catalyst 30 and the oxidation catalyst 32, a further temperature increase then takes place due to the complete oxidation of the hydrocarbons and the carbon monoxide. Moreover, a very selective oxidation of ammonia takes place here.

Figure 4:
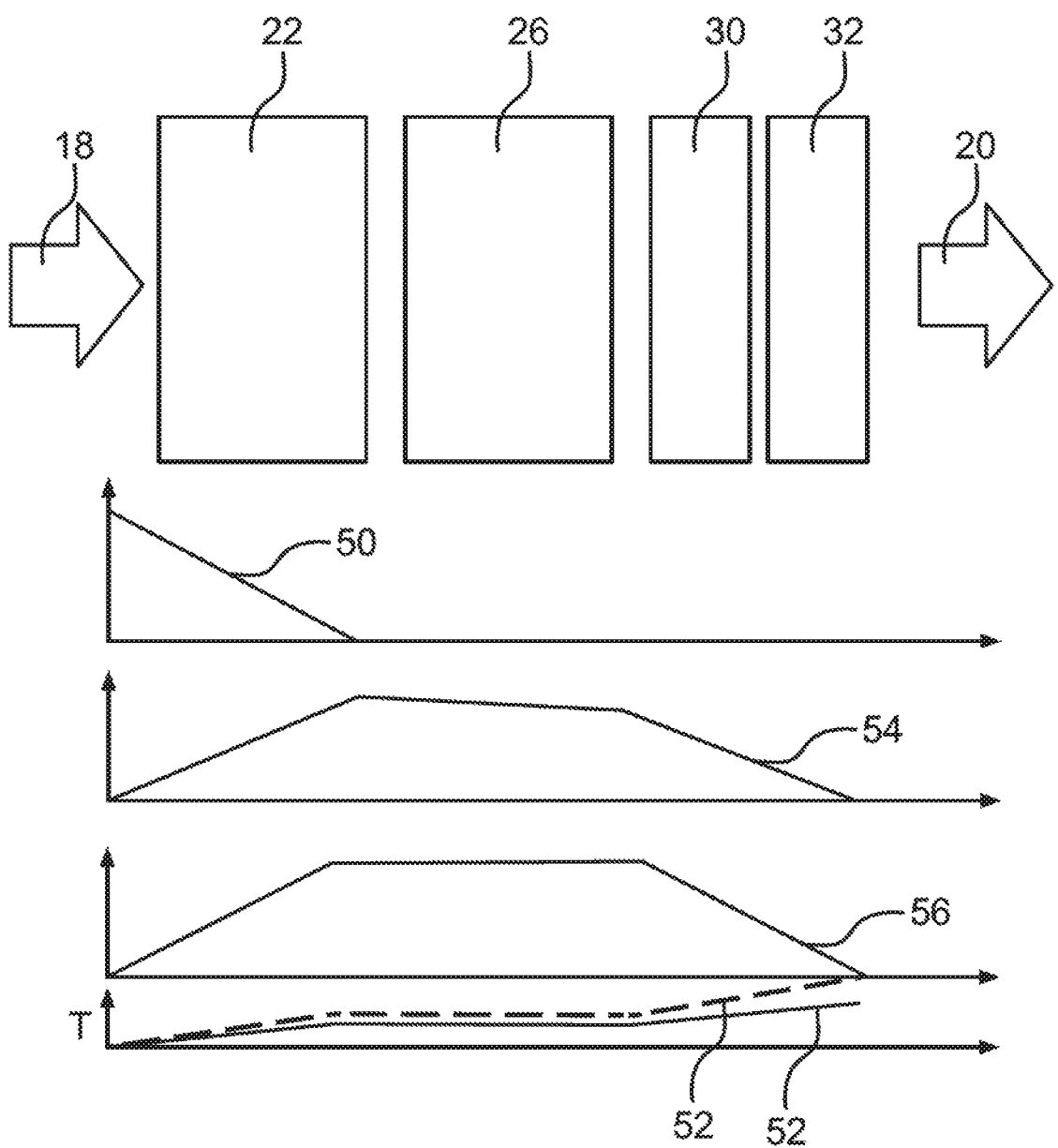
FIG. 4 shows the conditions in a situation according to FIG. 3, wherein a late after-injection is additionally carried out.

FIG. 4 illustrates a variant of the operation of the exhaust system 10, in which, for the purpose of regenerating the particulate filter 14, not only the secondary fuel injection, i.e. the introduction of fuel upstream of the SCR catalyst 22 containing vanadium, takes place by means of the dosing device. Rather, a late after-injection is additionally carried out. Thus fuel is injected into the cylinder of the combustion engine so late that this no longer participates in the combustion, but rather gets into the exhaust gas uncombusted.

The curves 50, 54, 56 again illustrate the conditions with regard to the presence of the long-chain hydrocarbons (curve 50), the short-chain hydrocarbons (curve 54) as well as of carbon monoxide (curve 56) seen in the direction of flow of the exhaust gas through the hybrid catalyst 12. However, a curve 58 in FIG. 4 shows that it results in a greater increase in temperature across the hybrid catalyst 12 than is the case in curve 52, accordingly also shown for comparison in FIG. 4.

Figure 5:
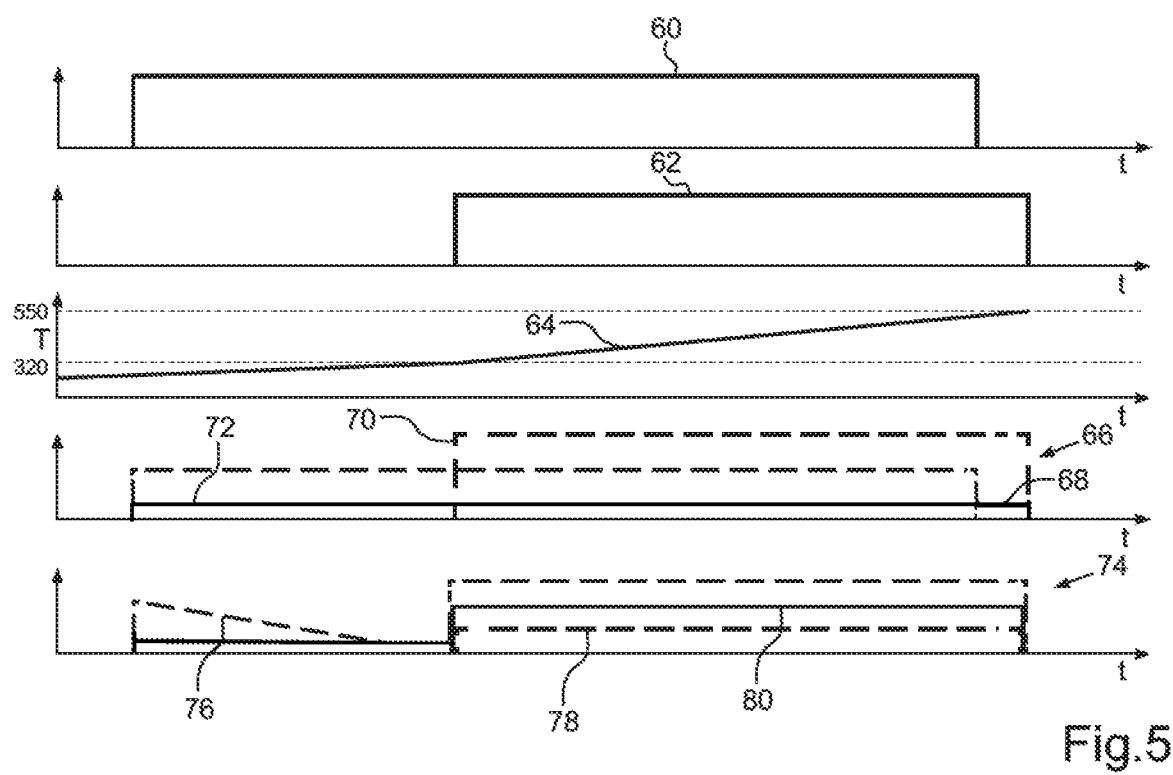

In FIG. 5, a first, highly schematised and thus presented as rectangular curve 60 illustrates the introduction of fuel into the hybrid catalyst 12 via the late after-injection. A second such curve 62 illustrates the introduction of fuel via the dosing device, which is provided upstream of the SCR catalyst 22 containing vanadium in the exhaust system 10, i.e. the secondary fuel injection.

By means of a further curve 64, which represents the progress of the temperature as a function of time, it is evident that the secondary fuel injection is preferred only at a temperature of more than 300 degrees Celsius. In a further graph 66 in FIG. 5, the time course of the content of short-chain hydrocarbons is illustrated by a curve 68, of long-chain hydrocarbons by a curve 70 and of carbon monoxide by a curve 72. Accordingly, particularly the secondary fuel injection ensures the presence of long-chain hydrocarbons in the exhaust gas. In contrast, predominantly short-chain hydrocarbons are made available by means of the late injection due to pre-reactions in the combustion chamber of the cylinder at the high temperatures and pressures which prevail there.

A further graph 74 in FIG. 5 illustrates the conditions existing on the output side of the catalyst 22 containing vanadium. Accordingly, the content of short-chain hydrocarbons decreases due to the increasing temperature until the onset of the secondary fuel injection (curve 62) (compare curve 76 in FIG. 5). Furthermore, short-chain hydrocarbons are formed from the long-chain hydrocarbons. Consequently, on the output side of the SCR catalyst 22 containing vanadium, a curve 78 is lower, which indicates the content of long-chain hydrocarbons, than is the case for curve 70 in graph 66. Finally, a curve 80 in graph 74 illustrates the provision of carbon monoxide due to the SCR catalyst 22 containing vanadium.

The invention claimed is:

1. An exhaust system for a motor vehicle, including an exhaust gas treatment device for after-treating exhaust gas of a combustion engine of the motor vehicle, the exhaust gas treatment device comprising:
   a first SCR catalyst, which has a zeolite material containing copper,
   a second SCR catalyst, arranged upstream of the first SCR catalyst, which has an SCR material containing vanadium,
   an ammonia slip catalyst, arranged downstream of both the first SCR catalyst and the second SCR catalyst, a particulate filter arranged downstream of the first SCR catalyst, the ammonia slip catalyst, and the second SCR catalyst, an oxidation catalyst, arranged downstream of the ammonia slip catalyst and upstream of the particulate filter, and a layer of zeolite material containing copper applied onto surfaces of the oxidation catalyst and the ammonia slip catalyst having at least one noble metal, the second SCR catalyst being applied onto a first carrier body separate from a second carrier body onto which the ammonia slip catalyst and the oxidation catalyst are applied.

2. The exhaust system according to claim 1, wherein a section of the exhaust system between the second SCR catalyst and the first SCR catalyst and/or between the first SCR catalyst and the ammonia slip catalyst is free from a further catalyst.

3. The exhaust system according to claim 1, wherein an output side of the first SCR catalyst is adjacent to an input side of the ammonia slip catalyst, and an input side of the first SCR catalyst is adjacent to an output side of the second SCR catalyst.

4. The exhaust system according to claim 1, wherein downstream section of the oxidation catalyst is free from the layer of zeolite material.

5. The exhaust system according to claim 1, wherein a noble metal content of the ammonia slip catalyst is smaller than a noble metal content of the oxidation catalyst.

6. The exhaust system according to claim 1, wherein the first SCR catalyst is applied onto the second carrier body.

7. The exhaust system according to claim 1, wherein fuel is introduced into the exhaust gas to be fed into the second SCR catalyst upstream of the second SCR catalyst, or a third SCR catalyst is arranged downstream of the particulate filter.

* * * * *